United States Patent
Yamada

(10) Patent No.: US 9,798,119 B2
(45) Date of Patent: Oct. 24, 2017

(54) ZOOM LENS AND IMAGE PICKUP APPARATUS

(71) Applicant: CANON KABUSHIKI KAISHA, Tokyo (JP)

(72) Inventor: Tomoya Yamada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/264,965

(22) Filed: Sep. 14, 2016

(65) Prior Publication Data

US 2017/0090164 A1 Mar. 30, 2017

(30) Foreign Application Priority Data

Sep. 30, 2015 (JP) ................................. 2015-194524

(51) Int. Cl.
| | |
|---|---|
| *G02B 15/02* | (2006.01) |
| *G02B 15/10* | (2006.01) |
| *G02B 5/00* | (2006.01) |
| *G02B 15/17* | (2006.01) |
| *G02B 27/00* | (2006.01) |

(52) U.S. Cl.
CPC ............. *G02B 15/10* (2013.01); *G02B 5/005* (2013.01); *G02B 15/17* (2013.01); *G02B 27/0025* (2013.01)

(58) Field of Classification Search
CPC ..................................................... G02B 15/10
USPC ........................................................ 359/675
See application file for complete search history.

(56) References Cited

U.S. PATENT DOCUMENTS

| | | |
|---|---|---|
| 4,157,211 A | 6/1979 | Tanaka et al. |
| 2012/0019924 A1 | 1/2012 | Shimomura |
| 2012/0224269 A1 | 9/2012 | Sakamoto |
| 2016/0028971 A1* | 1/2016 | Iriyama ................. G02B 15/17 348/294 |

FOREIGN PATENT DOCUMENTS

JP 2011075646 A 4/2011

OTHER PUBLICATIONS

Extended European Search Report issued in European Patent Application No. 16002001.2 dated Feb. 8, 2017.

* cited by examiner

*Primary Examiner* — James Jones
(74) *Attorney, Agent, or Firm* — Rossi, Kimms & McDowell LLP

(57) ABSTRACT

A zoom lens includes in order from an object side, a zoom lens unit that moves during zooming, and an aperture stop; and a relay lens unit that does not move for zooming, and the relay lens unit includes an extender lens unit changing a focal length range of the zoom lens by entering into and leaving from an optical path of the zoom lens, and that unit includes front, middle, and rear lens sub-units each including one positive lens and one negative lens. The following expressions are satisfied:

$0.250 < Nn-Np;$ $|fbp/fb| < 0.200;$ and $|fbn/fb| < 0.200,$ where Np and fbp denote a refractive index and a focal length of the positive lens, Nn and fbn denote a refractive index and a focal length of the negative lens, and fb denotes a focal length of the middle lens sub-unit.

15 Claims, 11 Drawing Sheets

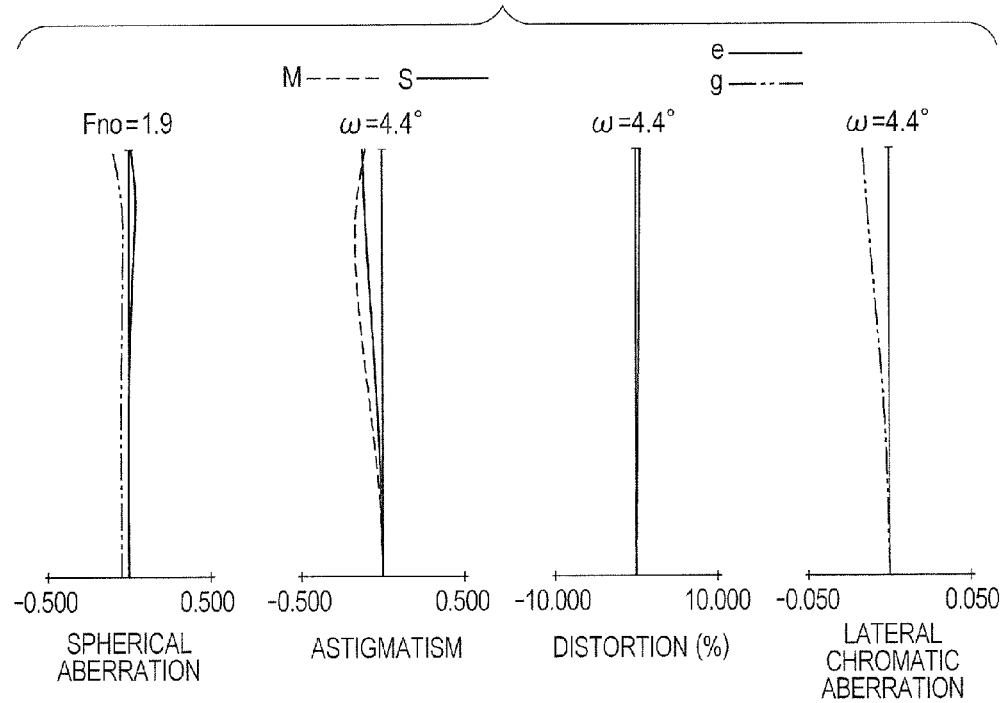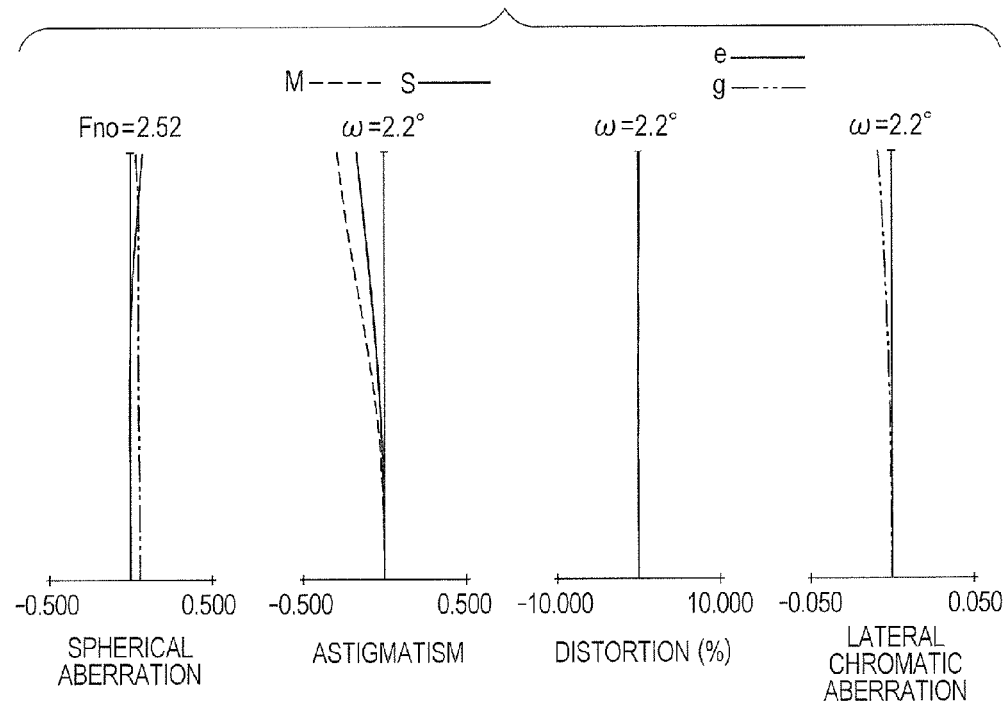

ZOOM LENS AND IMAGE PICKUP APPARATUS

BACKGROUND OF THE INVENTION

Field of the Invention

The present invention relates to a zoom lens with a built-in extender, which is suitable for a television camera, a video camera, a photograph camera, a television broadcast camera, and a movie camera.

Description of the Related Art

In recent years, a zoom lens having a high zoom ratio and an ability to achieve high optical performance has been demanded for an image pickup apparatus such as a television camera. A built-in extender technique has been known as a technique of covering a high zoom ratio with a single zoom lens. The built-in extender technique is a technique of shifting the focal length range of the zoom lens to a longer focus side by inserting an extender lens unit into a space reserved inside a relay lens unit which is not moved for zooming.

Japanese Patent Application Laid-Open No. 2011-75646 proposes a zoom lens suitable for a ⅔" television broadcast camera, the zoom lens including four lens units, and having a zoom ratio of 12× and an extender magnification of 2×.

In general, the extender lens unit may be divided into a front lens sub-unit and a rear lens sub-unit with the largest air space interposed therebetween. The front lens sub-unit having a positive refractive power converges substantially afocal input rays to reduce the beam height, and then the rear lens sub-unit having a negative refractive power converts the rays into substantially afocal rays again and outputs the resultant rays.

Using the lens system of Japanese Patent Application Laid-Open No. 2011-75646 as it is with the same lens total length and the same extender magnification, the zoom lens is required to improve its peripheral performance, in particular, in order to achieve further performance enhancement. To attain an extender with a high zoom ratio and high performance entails deterioration of the peripheral performance due to not only increases in aberration amounts but also a difficulty in correcting the Petzval sum. To avoid this, the arrangement of lenses in the extender needs to be set appropriately.

SUMMARY OF THE INVENTION

An object of the present invention is to provide a zoom lens with a built-in extender for which an arrangement of lenses is appropriately specified such that the expander can be small and lightweight and achieve both high zoom ratio and high performance.

A zoom lens according to the present invention includes in order from an object side to an image side: a zoom lens unit that moves during zooming, and an aperture stop; and a relay lens unit that does not move for zooming, in which the relay lens unit includes an extender lens unit changing a focal length range of the zoom lens by entering into and leaving from an optical path of the zoom lens. The extender lens unit includes a front lens sub-unit, a middle lens sub-unit, and a rear lens sub-unit. Each of the front lens sub-unit, the middle lens sub-unit, and the rear lens sub-unit includes a single positive lens and a single negative lens. The middle lens sub-unit satisfies the following expressions:

$0.250 < Nn - Np;$ $|fbp/fb| < 0.200;$ and $|fbn/fb| < 0.200,$ where Np and fbp respectively denote a refractive index and a focal length of the positive lens included in the middle lens sub-unit, Nn and fbn respectively denote a refractive index and a focal length of the negative lens included in the middle lens sub-unit, and fb denotes a focal length of the middle lens sub-unit.

According to the present invention, provided are a zoom lens with a built-in extender and an image pickup apparatus including the same, the zoom lens including a small and lightweight extender lens achieving high performance while being capable of changing a focal length range at a high zoom ratio.

Further features of the present invention will become apparent from the following description of exemplary embodiments with reference to the attached drawings.

BRIEF DESCRIPTION OF THE DRAWINGS

FIG. 2B is a longitudinal aberration diagram of Embodiments 1, 2, 3, and 4 set to focus to infinity at a focal length of 71.5 mm without the extender inserted.

FIG. 2C is a longitudinal aberration diagram of Embodiments 1, 2, 3, and 4 set to focus to infinity at a telephoto end without the extender inserted.

DESCRIPTION OF THE EMBODIMENTS

Hereinafter, features of zoom lenses of the present invention are described with reference to the accompanying drawings.

A zoom lens of any of Embodiments 1 to 4 of the present invention includes a focus lens unit, a zoom lens unit, an aperture stop for light amount adjustment, and a relay lens unit (fifth lens unit), which are arranged in this order from an object side to an image side. The zoom lens unit includes a lens unit which are moved for zooming. The relay lens unit is not moved for zooming, and includes a 51 lens unit and a 53 lens unit arranged in this order from the object side to the image side. The 53 lens unit has a positive refractive power. An extender lens unit (52 lens unit) that shifts a focal length range to a longer focus side is inserted into and retracted from a space between the 51 lens unit and the 53 lens unit.

Embodiment 1

Figure 1:
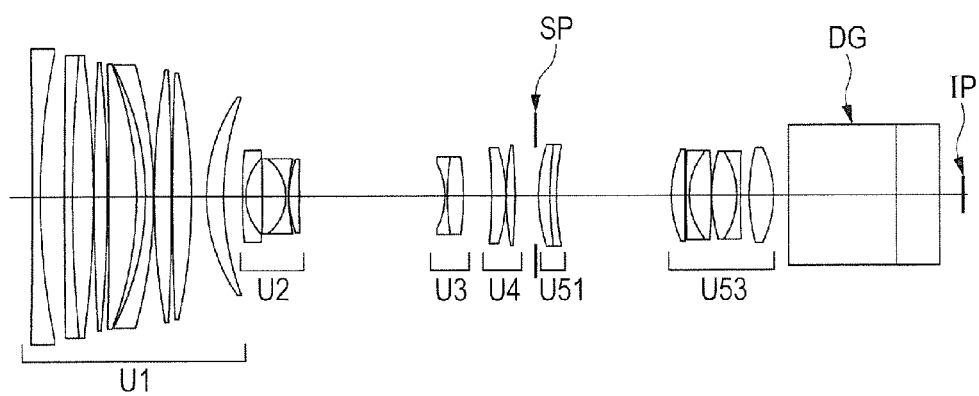
FIG. 1 is a cross sectional lens view of a zoom lens of any of Embodiments 1, 2, 3, and 4 in the present invention set to focus an object at infinity at a wide angle end without an extender inserted.

FIG. 1 is a cross sectional lens view of a zoom lens of Embodiment 1 of the present invention, the zoom lens set to focus an object at an infinite distance at a wide angle end without an extender inserted. Zoom lenses of Embodiments 2 to 4 to be described later have the same structure when their respective extenders are not inserted.

Reference sign U1 indicates a first lens unit which has a positive refractive power and is not moved for zooming. Some of lenses in the first lens unit U1 are moved in focusing from an object at an infinite distance to an object at a short distance. Reference sign U2 indicates a second lens unit for changing the zoom ratio, which has a negative refractive power and is moved to an image side in zooming from a wide angle end (short focal length end) to a telephoto end (long focal length end). Reference sign U3 indicates a third lens unit for changing the zoom ratio, which has a negative refractive power and is moved on an optical axis in zooming from the wide angle end (short focal length end) to the telephoto end (long focal length end). Reference sign U4 indicates a fourth lens unit which has a positive refractive power and corrects an image plane variation due to zooming. In Embodiments 1 to 4, the second, third, and fourth units constitute a zoom lens unit. Reference sign U5 indicates a relay lens unit which includes an aperture stop SP not moved for zooming, has a positive refractive power, and is not moved for zooming. The relay lens unit U5 includes two lens units U51 and U53, and a lens unit U52 can be inserted into and retracted from an optical path freely as needed. The lens units U51, U52, and U53 are not moved for zooming. Reference sign IP is an image plane, and corresponds to an imaging area of a solid-state image pickup element (photoelectric conversion element).

Next, description is provided for a structure of each lens unit without the extender inserted in Embodiments 1 to 4. The order of lenses in the following description indicates the order of lenses arranged from the object side to the image side.

The first lens unit U1 includes nine lenses, specifically, a negative lens, a negative lens, a positive lens, a positive lens, a positive lens, a negative lens, a positive lens, a positive lens, and a positive lens. In focusing at a short distance, four of the lenses, namely, the fifth to eighth lenses from the object side are moved to the object side, and the single positive lens disposed on the most image side is also moved to the object side together. The second lens unit U2 includes a negative lens, a cemented lens of a positive lens and a negative lens, and a positive lens. The third lens unit U3 includes a cemented lens of a negative lens and a positive lens. The fourth lens unit U4 includes a positive lens and a positive lens. In zooming, the second lens unit, the third lens unit, and the fourth lens unit are moved. The 51 lens unit U51 includes a cemented lens of a positive lens and a negative lens. The 53 lens unit U53 includes a positive lens, a cemented lens of a negative lens and a positive lens, a cemented lens of a positive lens and a negative lens, and a positive lens.

Figure 3:
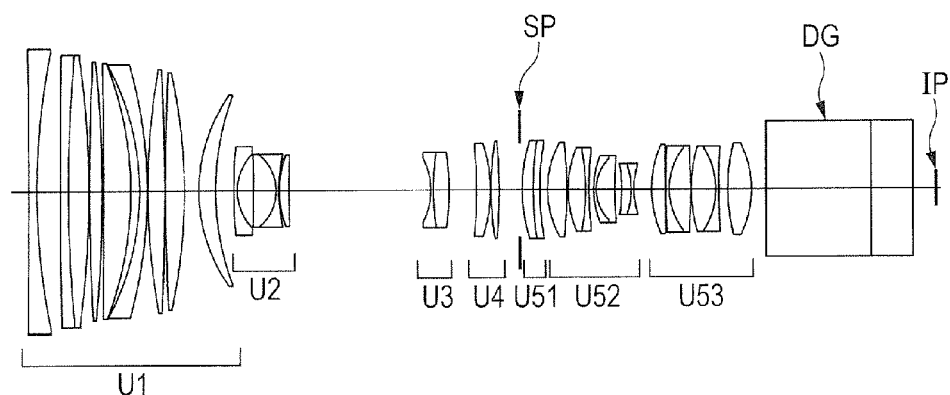
FIG. 3 is a cross sectional lens view of a zoom lens of Embodiment 1 (extender magnification of 2.0×) in the present invention set to focus an object at infinity at a wide angle end with the extender inserted.

FIG. 3 is a cross sectional lens view of the zoom lens of Embodiment 1 of the present invention, the zoom lens set to focus an object at infinity at the wide angle end with an extender inserted. The 52 lens unit U52 serving as an extender lens is inserted into a space, which is formed between the 51 lens unit U51 and the 53 lens unit U53 before the extender is inserted. The 52 lens unit U52 includes three lens sub-units, namely, a front lens sub-unit, a middle lens sub-unit, and a rear lens sub-unit, each including a cemented lens. The front lens sub-unit includes a positive lens and a cemented lens of a positive lens and a negative lens, the middle lens sub-unit includes a cemented lens of a negative lens and a positive lens, and the rear lens sub-unit includes a cemented lens of a positive lens and a negative lens.

In order to obtain a high performance extender while the total length of the extender is kept as it is, it is necessary to correct a spherical aberration and a chromatic aberration and to correct a Petzval sum, all together. In the case of an extender including only two or less combinations each being an equivalent to a cemented lens, there is a limit to correction of the Petzval sum if the axial chromatic aberration and the lateral chromatic aberration are corrected. For this reason, the extender needs to include three or more combinations each being an equivalent to a cemented lens. In such correction, it is suitable that the axial chromatic aberration be corrected mainly by the front lens sub-unit in which the beam height of axial rays is greatest, and the lateral chromatic aberration be corrected mainly by the rear lens sub-unit in which the beam height of off-axial rays is high. Accordingly, for the purpose of achieving most effective aberration correction, it is necessary to configure the middle lens sub-unit to be capable of mainly correcting the Petzval sum, while configuring the front lens sub-unit to correct the axial chromatic aberration and the rear lens sub-unit to correct the lateral chromatic aberration.

In order to correct the Petzval sum most effectively, the negative lens and the positive lens arranged adjacent to each other in the middle lens sub-unit need to have a large refractive index difference therebetween, and accordingly need to have reflective indices at certain levels. However, if the middle lens sub-unit has a high positive refractive power as a whole, the rear lens sub-unit has a high refractive power. On the other hand, if the middle lens sub-unit has a high negative refractive power as a whole, the front lens sub-unit has a high refractive power. In this case, the aberration correction becomes difficult. Moreover, if the middle lens sub-unit has a high positive refractive power, the principal points of a combination of the front lens sub-unit and the middle lens sub-unit come close to the principal points of the rear lens sub-unit. On the other hand, if the middle lens sub-unit has a high negative refractive power, the principal points of a combination of the middle lens sub-unit and the rear lens sub-unit come close to the principal points of the front lens sub-unit. Accordingly, the sensitivity to manufacturing is increased. To avoid this, the middle lens sub-unit needs to have a low refractive power. In addition, in the case where the middle lens sub-unit includes a cemented lens of a positive lens and a negative lens, the absolute values of the focal lengths of the two lenses need to be approximately equal to each other.

The zoom lens with a built-in extender of the present invention includes a zoom lens unit, an aperture stop, and a relay lens unit arranged in this order from the object side to the image side. The zoom lens unit is moved for zooming, whereas the aperture stop and the relay lens unit are not moved for zooming. The zoom lens includes an extender lens unit that changes the focal length range of the zoom lens by being inserted into or retracted from the optical path of the relay lens unit. The extender lens unit includes a front lens sub-unit, a middle lens sub-unit, and a rear lens sub-unit, each lens sub-unit including at least one positive lens and at least one negative lens. Moreover, the zoom lens satisfies the following expression:

$$0.250 < Nn - Np \quad (1),$$

where Np and Nn respectively denote refractive indices of the positive lens and the negative lens included in the middle lens sub-unit.

The conditional expression (1) specifies a difference between the refractive index Nn of the negative lens and the refractive index Np of the positive lens, which are included in the middle lens sub-unit of the extender lens unit U52. If the conditional expression (1) is satisfied, it is possible to make proper control of the Petzval sum, which is indispensable for the performance enhancement, and thereby the zoom lens can achieve the high optical performance over the entire field of view (the entire picked up image). If the conditional expression (1) is not satisfied, the Petzval sum deteriorates to worsen the performance at the periphery of the field of view.

It is more preferable to set the conditional expression (1) as follows:

$$0.290 < Nn - Np \quad (1a).$$

It is even more preferable to set the conditional expression (1) as follows:

$$0.350 < Nn - Np \quad (1b).$$

As another aspect of the present invention, focal length ratios of the positive lens and the negative lens included in the middle lens sub-unit with respect to the middle lens sub-unit in the extender lens unit are specified by the following conditional expressions (2) and (3):

$$|fbp/fb| < 0.200 \quad (2), \text{ and}$$

$$|fbn/fb| < 0.200 \quad (3).$$

It is more preferable to set the conditional expressions (2) and (3) as follows:

$$|fbp/fb| < 0.180 \quad (2a), \text{ and}$$

$$|fbn/fb| < 0.180 \quad (3a).$$

In these expressions, fb denotes a focal length of the middle lens sub-unit in the extender lens unit, fbp denotes a focal length of the positive lens included in the middle lens sub-unit, and fbn denotes a focal length of the negative lens included in the middle lens sub-unit. Satisfying the conditional expressions (2) and (3), the positive lens and the negative lens come to have such refractive powers that the Petzval sum can be corrected. Without satisfying the conditional expressions (2) and (3), the positive lens and the negative lens come to have such low refractive powers that the Petzval sum is difficult to correct.

As another aspect of the present invention, the position of the negative lens included in the middle lens sub-unit is specified by the following conditional expression (4):

$$0.35 < L\_b/L\_IE < 0.65 \quad (4).$$

In the above expression, L_IE denotes a total length of the extender lens unit, and L_b denotes a length from the object-side vertex position of the lens disposed on the most object side among the lenses in the extender lens unit to the image-side vertex position of the negative lens included in the middle lens sub-unit of the extender lens unit. If the conditional expression (4) is satisfied, the Petzval sum can be corrected at a position where the axial rays and the off-axial rays are well balanced and neither of their heights is too great. If the middle lens sub-unit exceeds the upper limit of the conditional expression (4), the height of the off-axial rays is so great that the middle lens sub-unit may adversely affect the lateral chromatic aberration and therefore make it difficult to correct the chromatic aberration properly. If the middle lens sub-unit falls below the lower limit of the conditional expression (4), the height of the axial rays is so great that the middle lens sub-unit may adversely affect the axial chromatic aberration, and make it difficult to correct the chromatic aberration properly.

In addition, the zoom lens with a built-in extender of the present invention is a zoom lens which satisfies the following conditional expression (5):

$$|vn - vp| < 25.00 \quad (5),$$

where vp and vn respectively denote the Abbe numbers of the positive lens and the negative lens included in the middle lens sub-unit of the extender lens unit.

The conditional expression (5) specifies the difference between the Abbe number vn of the negative lens and the Abbe number vp of the positive lens included in the middle lens sub-unit in the extender lens unit U52. If the conditional expression (5) is satisfied, the adjacent surfaces of the negative lens and the positive lens can have such refractive power that the Petzval sum can be controlled. If the conditional expression (5) is not satisfied, the curvatures of these adjacent surfaces are so small that the two lenses have low refractive powers. This results in easy deterioration of the Petzval sum.

It is more preferable to set the conditional expression (5) as follows:

$$|vn-vp|<20.00 \tag{5a}$$

As another aspect of the present invention, the focal length ratios of the front lens sub-unit and the rear lens sub-unit with respect to the middle lens sub-unit in the extender lens unit are specified by the following conditional expressions (6) and (7):

$$|fa/fb|<0.250 \tag{6},$$

$$|fc/fb|<0.150 \tag{7}.$$

In the above expressions, fa denotes the focal length of the front lens sub-unit, fb denotes the focal length of the middle lens sub-unit, and fc denotes the focal length of the rear lens sub-unit in the extender lens unit. If the conditional expressions (6) and (7) are satisfied, the refractive power of the middle lens sub-unit is kept low relative to the refractive powers of the front lens sub-unit and the rear lens sub-unit, which enables the middle lens sub-unit to make effective correction of the Petzval sum and enables the front lens sub-unit and the rear lens sub-unit to make effective correction of the spherical aberration. If the conditional expressions (6) and (7) are not satisfied, the middle lens sub-unit has a high refractive power. As a result, if the middle lens sub-unit has a high positive refractive power, the principal point positions of the combination of the front lens sub-unit and the middle lens sub-unit come close to the principal point positions of the rear lens sub-unit. On the other hand, if the middle lens sub-unit has a high negative refractive power, the principal point positions of the combination of the middle lens sub-unit and the rear lens sub-unit come close to the principal point positions of the front lens sub-unit. In either case, proper correction of the spherical aberration is difficult and the sensitivity to manufacturing also increases.

In addition, the zoom lens of the present invention satisfies the following expression (8):

$$0.80<|fbn/fbp|<1.30 \tag{8},$$

where fbp and fbn respectively denote the focal lengths of the positive lens and the negative lens included in the middle lens sub-unit in the extender lens unit U52.

The conditional expression (8) specifies a ratio of the focal length fbn of the negative lens to the focal length fbp of the positive lens included in the middle lens sub-unit in the extender lens unit U52. If the conditional expression (8) is satisfied, the negative lens and the positive lens can have approximately comparable refractive powers, and accordingly the refractive power of the middle lens sub-unit is low. Thus, the spherical aberration can be corrected properly. If the middle lens sub-unit falls below the lower limit of the conditional expression (8), the middle lens sub-unit has a high negative refractive power and accordingly the front lens sub-unit has a high refractive power, which makes the aberration correction difficult. On the other hand, if the middle lens sub-unit exceeds the upper limit of the conditional expression (8), the middle lens sub-unit has a high positive refractive power and accordingly the rear lens sub-unit has a high refractive power, which makes the aberration correction difficult.

It is more preferable to set the conditional expression (8) as follows:

$$0.85<|fbn/fbp|<1.25 \tag{8a}.$$

As another aspect of the present invention, it is desirable that the middle lens sub-unit include a single cemented lens of a lens having a negative refractive power and a lens having a positive refractive power. In the extender lens unit U52, the middle lens sub-unit receives axial rays and off-axial rays both having not-too great heights as compared with the front lens sub-unit and the rear lens sub-unit, and thus it is important to effectively correct the Petzval sum at the middle lens sub-unit. A structure in which the middle lens sub-unit includes a single cemented lens of a lens having a negative refractive power and a lens having a positive refractive power is advantageous to correct the Petzval sum.

As another aspect of the present invention, it is desirable that the front lens sub-unit include a single lens having a positive refractive power and a single cemented lens of a lens having a positive refractive power and a lens having a negative refractive power. In the extender lens unit U52, the front lens sub-unit receives input rays having a greater height than those in the middle lens sub-unit and the rear lens sub-unit, and thus it is important to correct the spherical aberration and the axial chromatic aberration at the front lens sub-unit. A structure in which the front lens sub-unit includes a single lens having a positive refractive power and a single cemented lens of a lens having a positive refractive power and a lens having a negative refractive power is advantageous to correct the spherical aberration and the axial chromatic aberration.

As another aspect of the present invention, it is desirable that the rear lens sub-unit include a single cemented lens of a lens having a positive refractive power and a lens having a negative refractive power. In the extender lens unit U52, the rear lens sub-unit has a higher refractive power than the front lens sub-unit and the middle lens sub-unit. For this reason, unless the rear lens sub-unit has a structure for correcting the chromatic aberration, a large chromatic aberration occurs. Hence, a structure in which the rear lens sub-unit includes a single cemented lens of a lens having a positive refractive power and a lens having a negative refractive power is advantageous to correct the chromatic aberration.

As another aspect of the present invention, a ratio of an input beam height to an output beam height in extender lens unit U52 is specified by the conditional expression (9):

$$1.60<h\_in/h\_out<2.60 \tag{9}.$$

In the above expression, h_in denotes the maximum beam height of axial rays on the surface closest to the object in the extender lens unit U52 set to focus to infinity at the wide angle end, and h_out denotes the maximum beam height of the axial rays on the surface closest to the image in the extender lens unit U52 thus set. Satisfying the conditional expression (9), an extender lens can be obtained which achieves high zoom ratio and high optical performance over the entire field of view. If the extender lens unit exceeds the upper limit of the conditional expression (9), the refractive powers of the front lens sub-unit and the rear lens sub-unit are so high that it is difficult to correct the aberrations. On the other hand, if the extender lens unit falls below the lower limit of the conditional expression (9), the reduction in the beam height is insufficient, and the extender magnification thereof is lowered.

It is more preferable to set the conditional expression (9) as follows:

$$1.90<h\_in/h\_out<2.40 \tag{9a}.$$

As another aspect of the present invention, a ratio of the input beam height of the extender lens unit U52 to the total length of the extender lens unit is specified by the following conditional expression (10):

$$0.48 < h\_in/L\_IE < 0.55 \tag{10}$$

In the above expression, h_in denotes the maximum beam height of the axial rays on the surface closest to the object in the extender lens unit U52 set to focus to infinity at the wide angle end, and L_IE denotes the total length of the extender lens unit. If the conditional expression (10) is satisfied, a small extender lens achieving high optical performance over the entire field of view can be obtained. If the extender lens unit exceeds the upper limit of the conditional expression (10), the refractive powers of the front lens sub-unit and the rear lens sub-unit are so high that it is difficult to correct the aberrations. On the other hand, if the extender lens unit falls below the lower limit of the conditional expression (10), the total length of the extender lens unit is so long that downsizing is difficult.

As another aspect of the present invention, it is desirable that the negative lens and the positive lens included in the middle lens sub-unit adjacent to each other, and the object-side lens of the two lenses satisfy the following conditional expression (11) specifying a ratio of the curvature radius of the image-side surface of the object-side lens to an effective beam diameter on the image-side surface:

$$1.00 < R\_b/h\_b < 2.00 \tag{11}$$

In the above expression, R_b denotes the curvature radius of the image-side surface of the object-side lens included in the middle lens sub-unit, and h_b denotes the effective beam diameter of the image-side surface. If the conditional expression (11) is satisfied, rays are inputted in a direction normal to the curvature of the image-side surface. This makes it possible to reduce the occurrence of the spherical aberration and thereby to achieve the proper aberration correction. If the middle lens sub-unit exceeds the upper limit of the conditional expression (11), the curvature radius of the image-side surface is so large that the refractive power of the lens is too small. This makes the Petzval sum correction difficult. If the middle lens sub-unit falls below the lower limit of the conditional expression (11), the curvature radius of the image-side surface is too small. This makes aberration reduction difficult, and hinders the proper aberration correction.

The zoom lens of the present invention includes the first lens unit, the second lens unit, and the third lens unit arranged in this order from the object side. The first lens unit is not moved for zooming and has a positive refractive power, the second lens unit is moved for zooming and has a negative refractive power, and the third lens unit is moved for zooming and has a negative refractive power. This structure tends to have difficulty in correction of the Petzval sum. Thus, the correction of the Petzval sum according to the present invention is particularly effective to the above structure.

Figure 2A:
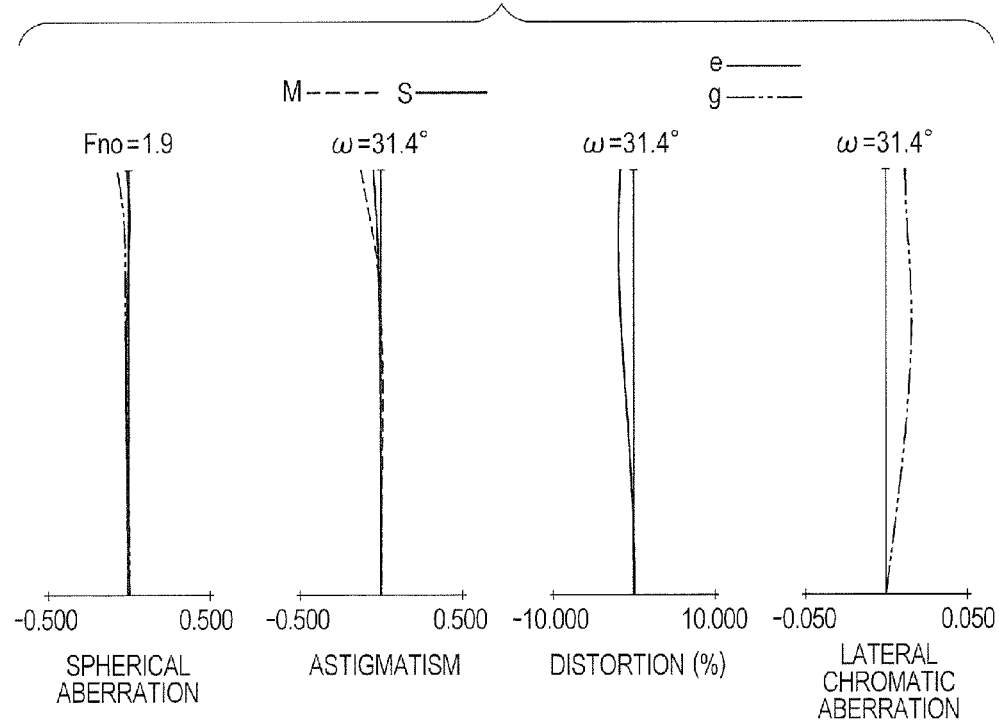
FIG. 2A is a longitudinal aberration diagram of Embodiments 1, 2, 3, and 4 set to focus to infinity at a wide angle end without the extender inserted.
Figure 4A:
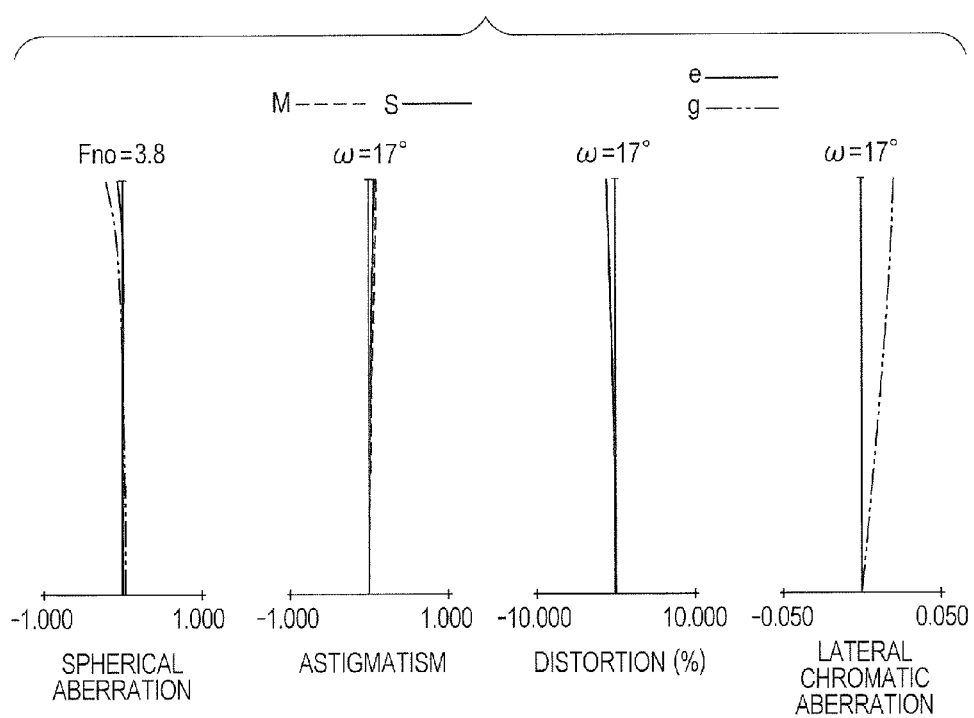
FIG. 4A is a longitudinal aberration diagram of Embodiment 1 (extender magnification of 2.0×) set to focus to infinity at the wide angle end with the extender inserted.
Figure 4B:
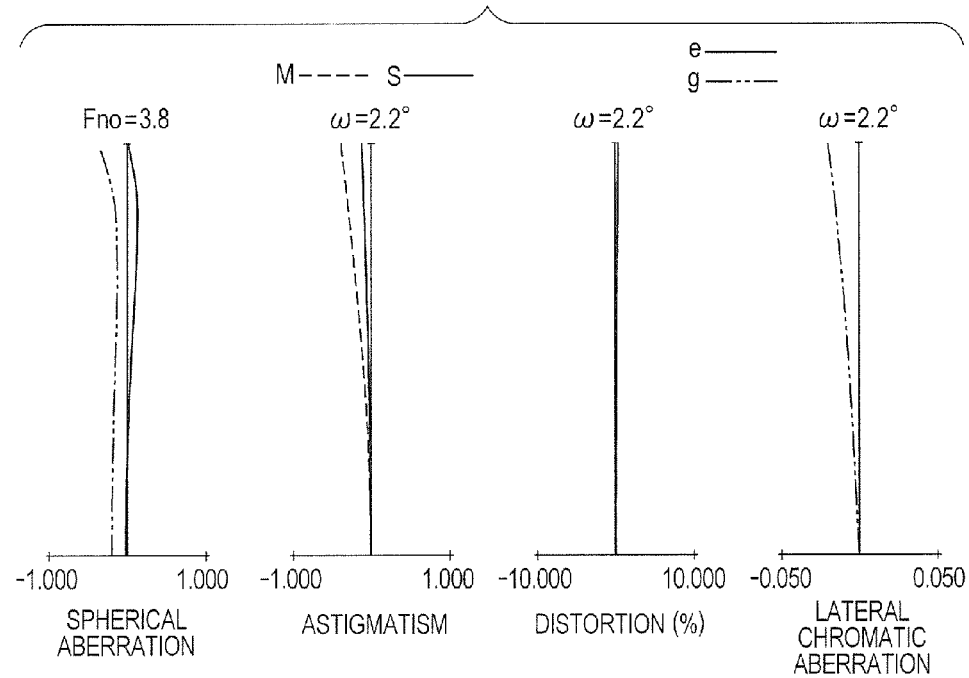
FIG. 4B is a longitudinal aberration diagram of Embodiment 1 (extender magnification of 2.0×) set to focus to infinity at a focal length of 143.0 mm with the extender inserted.
Figure 4C:
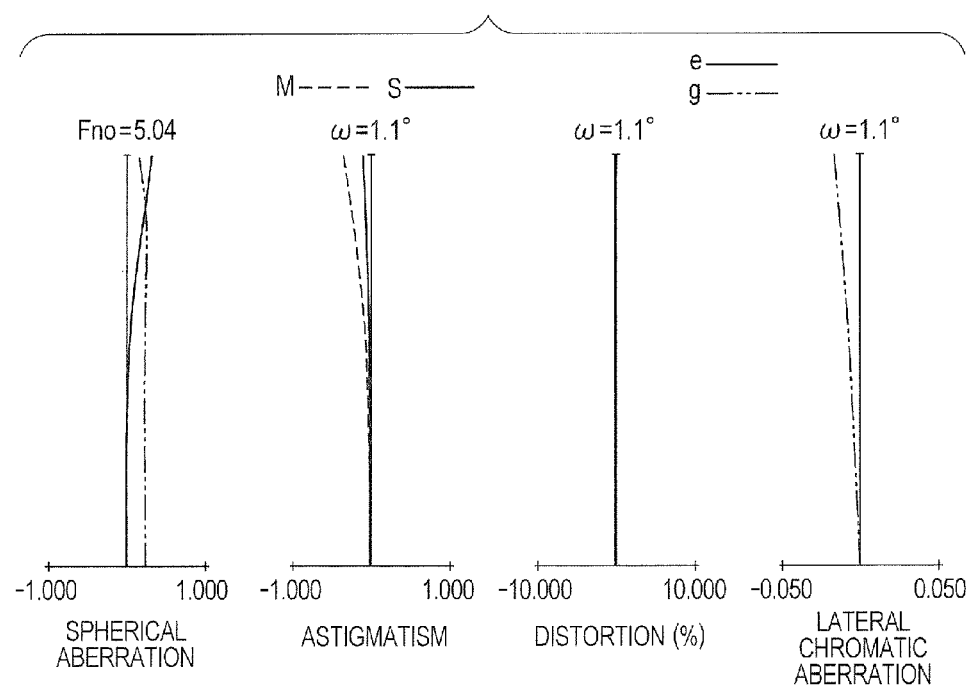
FIG. 4C is a longitudinal aberration diagram of Embodiment 1 (extender magnification of 2.0×) set to focus to infinity at a telephoto end with the extender inserted.

FIGS. 2A, 2B and 2C present longitudinal aberration diagrams the zoom lens of Embodiment 1 set to focus to infinity at the wide angle end, at a focal length of 71.5 mm, and at the telephoto end, respectively, with the extender retracted. Here, the value of the focal length is a value in the following numerical embodiments expressed in units of mm. In addition, some of the lenses in the first lens unit are moved in focusing at a short distance. FIGS. 4A, 4B and 4C present longitudinal aberration diagrams of the zoom lens of Embodiment 1 set to focus to infinity at the wide angle end, at a focal length of 143.0 mm, and at the telephoto end, respectively, with the extender inserted. The aberration diagrams with the extender retracted are depicted on scales of spherical aberration on 0.5 mm, astigmatism on 0.5 mm, distortion on 10%, and lateral chromatic aberration on 0.05 mm. The aberration diagrams with the extender inserted are depicted on scales of spherical aberration on 1.00 mm, astigmatism on 1.00 mm, distortion on 10%, and lateral chromatic aberration on 0.050 mm. Fno denotes an F number, and c denotes a half angle of view. Here, the wide angle end and the telephoto end refer to zooming positions where the second lens unit U2 for changing the zoom ratio is positioned, respectively, at one end and the other end of a mechanically movable range on the optical axis. The same terminologies and others also apply to the following Embodiments.

Embodiment 1 is a zoom lens with an extender magnification of 2.0×.

The following (Numerical Embodiment 1) presents numerical data of a numerical embodiment 1 for Embodiment 1. In this data, r denotes a curvature radius of each of surfaces in the order from the object side, d denotes a distance between surfaces, and nd and vd denote a refractive index based on the d line and an Abbe number of each optical component. The Abbe number vd is expressed by:

$$vd = (nd-1)/(nF-nC),$$

where nd, nC, and nF denote refractive indices at the d line, the C line, and the F line, respectively.

Assuming that an X axis is set in an optical axial direction, an H axis is set in a direction perpendicular to the optical axis, a positive sign indicates an advanced side in a light traveling direction, R denotes a paraxial curvature radius, k denotes a conic constant, and A4, A6, A8, A10, A12, A14, and A16 denote aspheric coefficients, an aspheric shape is expressed by the following expression:

$$X = \frac{H^2/R}{1 + \sqrt{1 - (1+k)(H/R)^2}} + A4H^4 + A6H^6 + A8H^8 + A10H^{10} + A12H^{12} + A14H^{14} + A16H^{16}.$$

In addition, "e–z" means "×10⁻ᶻ", and the sign * beside the surface number indicates that the surface is an aspheric surface.

Table 1 presents the values for the conditional expressions (1) to (11) obtained from the numerical embodiment 1.

The numerical embodiment 1 satisfies all the conditional expressions (1) to (11), and thus the extender is a high zoom ratio extender which is small and lightweight, and achieves high optical performance from the center to the periphery of the field of view.

Embodiment 2

Figure 5:
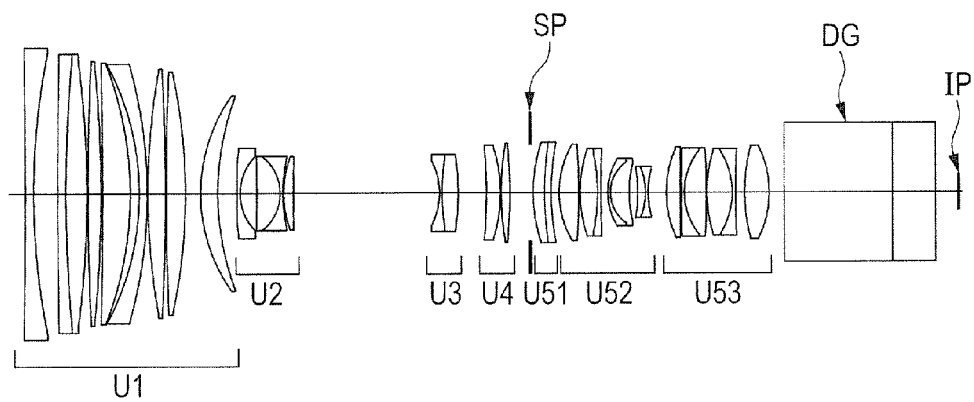
FIG. 5 is a cross sectional lens view of the zoom lens of Embodiment 2 (extender magnification of 2.0×) in the present invention set to focus an object at infinity at a wide angle end with the extender inserted.

FIG. 5 is a cross sectional lens view of a zoom lens of Embodiment 2 set to focus an object at infinity at the wide angle end with an extender inserted.

An extender lens unit U52 in Embodiment 2 has a structure similar to that in Embodiment 1. Specifically, the extender lens unit U52 can be divided into a front lens sub-unit, a middle lens sub-unit, and a rear lens sub-unit each including a cemented lens. The front lens sub-unit includes a positive lens and a cemented lens of a positive lens and a negative lens, the middle lens sub-unit includes a cemented lens of a negative lens and a positive lens, and the rear lens sub-unit includes a cemented lens of a negative lens and a positive lens.

Figure 6A:
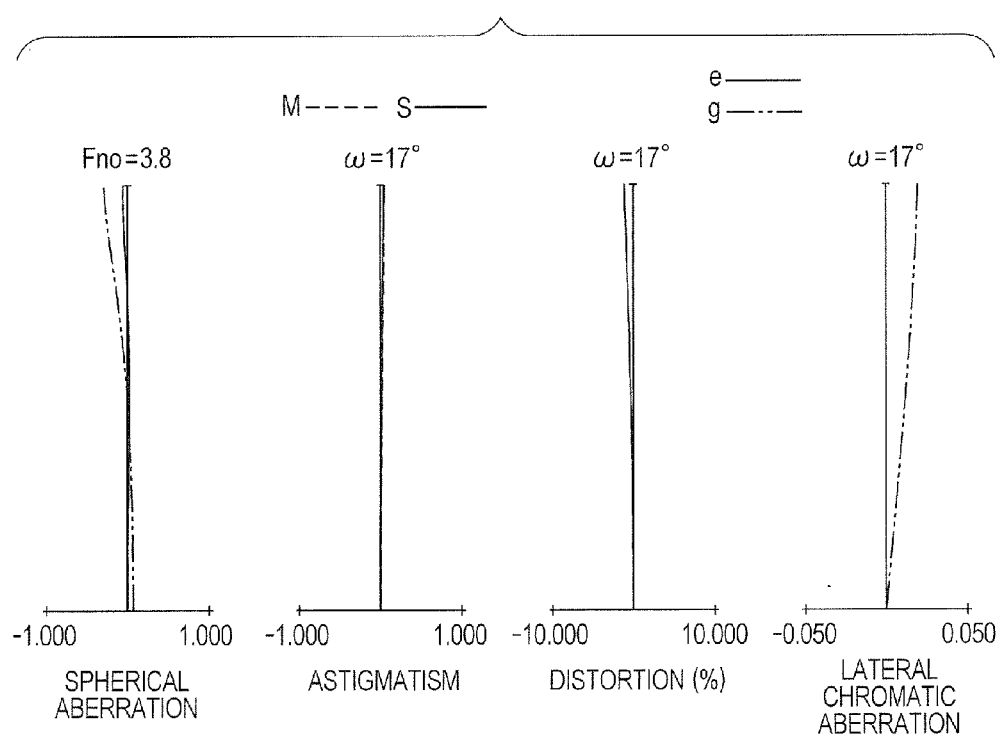
FIG. 6A is a longitudinal aberration diagram of Embodiment 2 (extender magnification of 2.0×) set to focus to infinity at the wide angle end with the extender inserted.
Figure 6B:
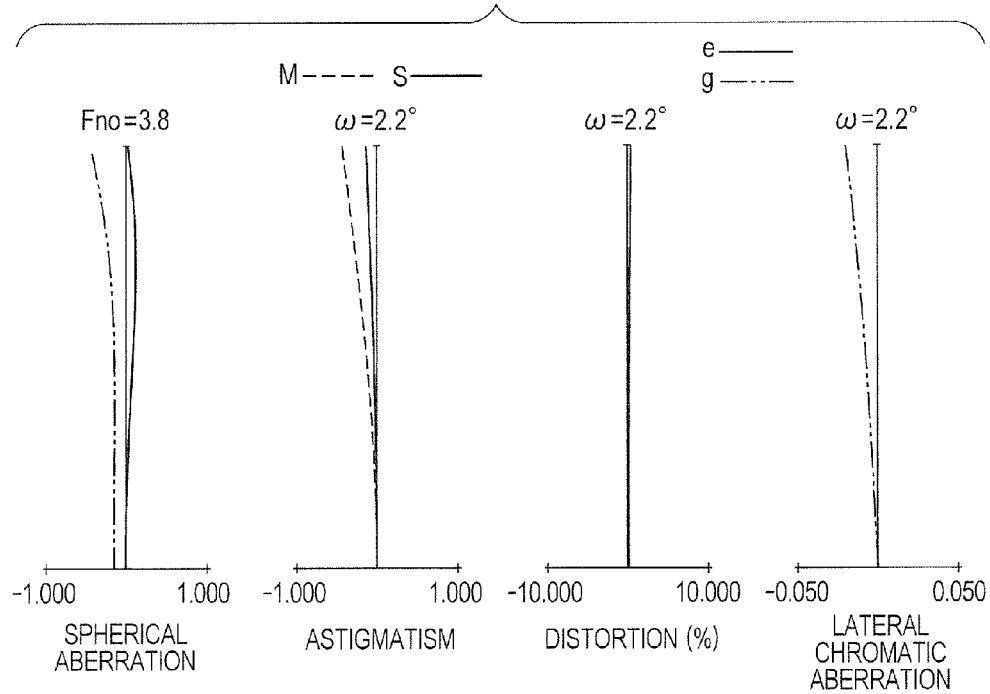
FIG. 6B is a longitudinal aberration diagram of Embodiment 2 (extender magnification of 2.0×) set to focus to infinity at a focal length of 143.0 mm with the extender inserted.
Figure 6C:
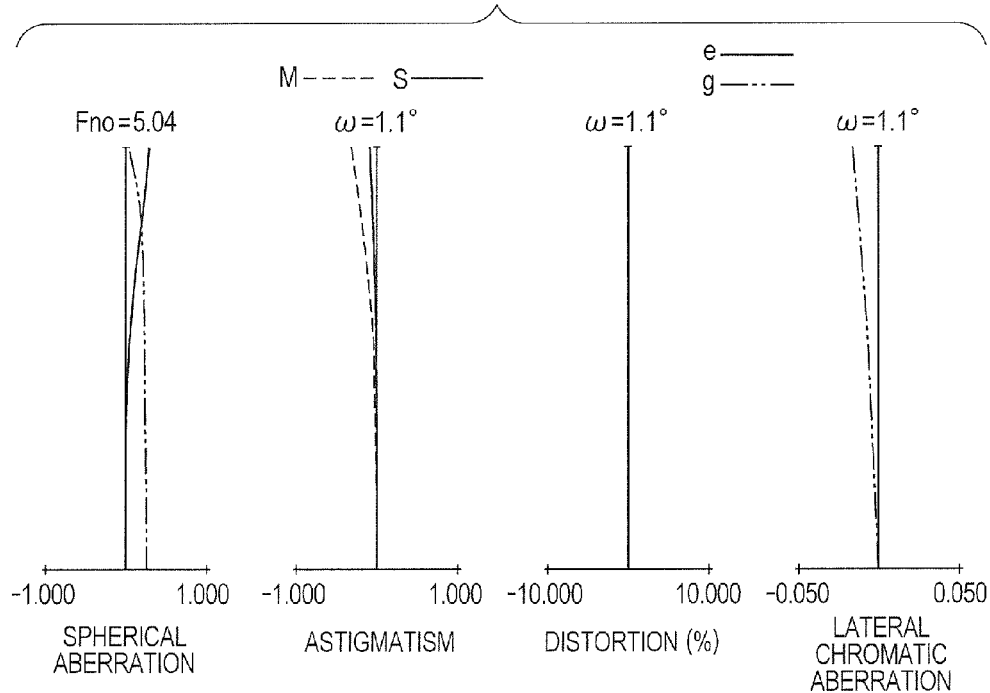
FIG. 6C is a longitudinal aberration diagram of Embodiment 2 (extender magnification of 2.0×) set to focus to infinity at a telephoto end with the extender inserted.

FIGS. 6A, 6B and 6C present longitudinal aberration diagrams of the zoom lens of Embodiment 2 set to focus to infinity at the wide angle end, at a focal length of 143.0 mm, and at the telephoto end, respectively, with the extender inserted. Embodiment 2 is a zoom lens with an extender magnification of 2.0×.

The following (Numerical Embodiment 2) presents numerical data of a numerical embodiment 2 for Embodiment 2.

Table 1 presents the values for the conditional expressions (1) to (11) obtained from the numerical embodiment 2.

The numerical embodiment 2 satisfies all the conditional expressions (1) to (11), and thus the extender is a high zoom ratio extender which is small and lightweight, and achieves high optical performance from the center to the periphery of the field of view.

Embodiment 3

Figure 7:
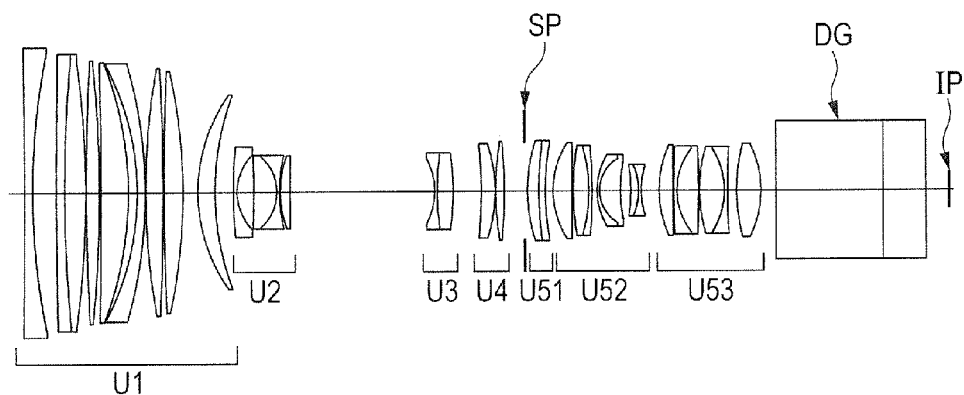
FIG. 7 is a cross sectional lens view of the zoom lens of Embodiment 3 (extender magnification of 2.0×) in the present invention set to focus an object at infinity at a wide angle end with the extender inserted.

FIG. 7 is a cross sectional lens view of a zoom lens of Embodiment 3 set to focus an object at infinity at the wide angle end with an extender inserted.

An extender lens unit U52 in Embodiment 3 has a structure similar to those in Embodiments 1 and 2. Specifically, the extender lens unit U52 can be divided into a front lens sub-unit, a middle lens sub-unit, and a rear lens sub-unit each including a cemented lens. The front lens sub-unit includes a positive lens and a cemented lens of a positive lens and a negative lens, the middle lens sub-unit includes a cemented lens of a negative lens and a positive lens, and the rear lens sub-unit includes a cemented lens of a negative lens and a positive lens.

Figure 8A:
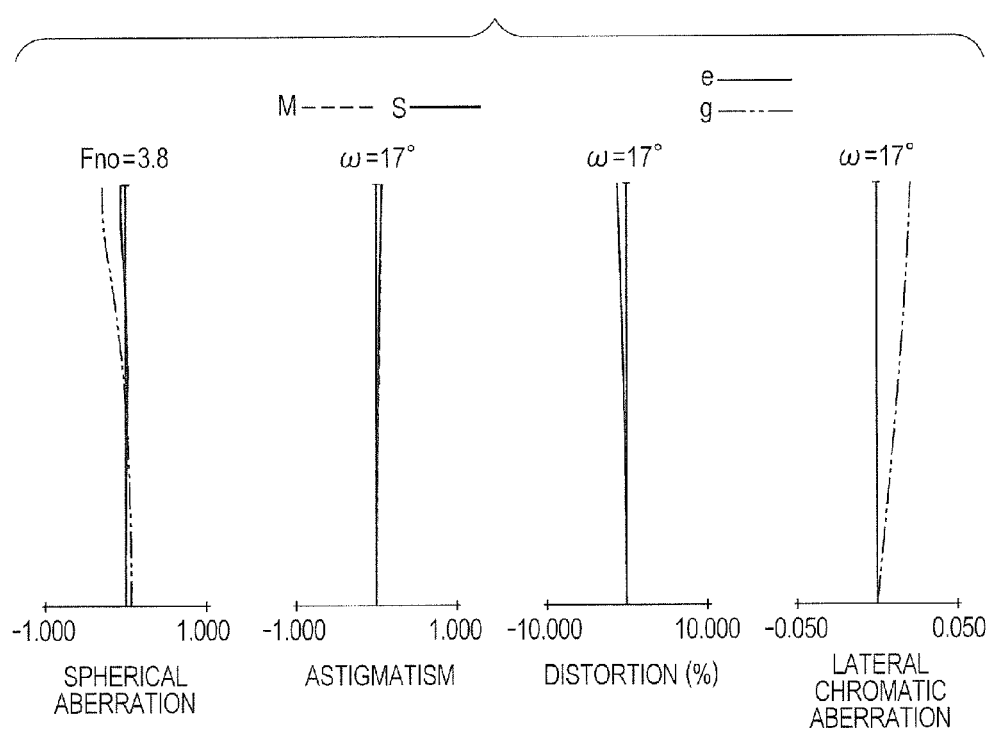
FIG. 8A is a longitudinal aberration diagram of Embodiment 3 (extender magnification of 2.0×) set to focus to infinity at the wide angle end with the extender inserted.
Figure 8B:
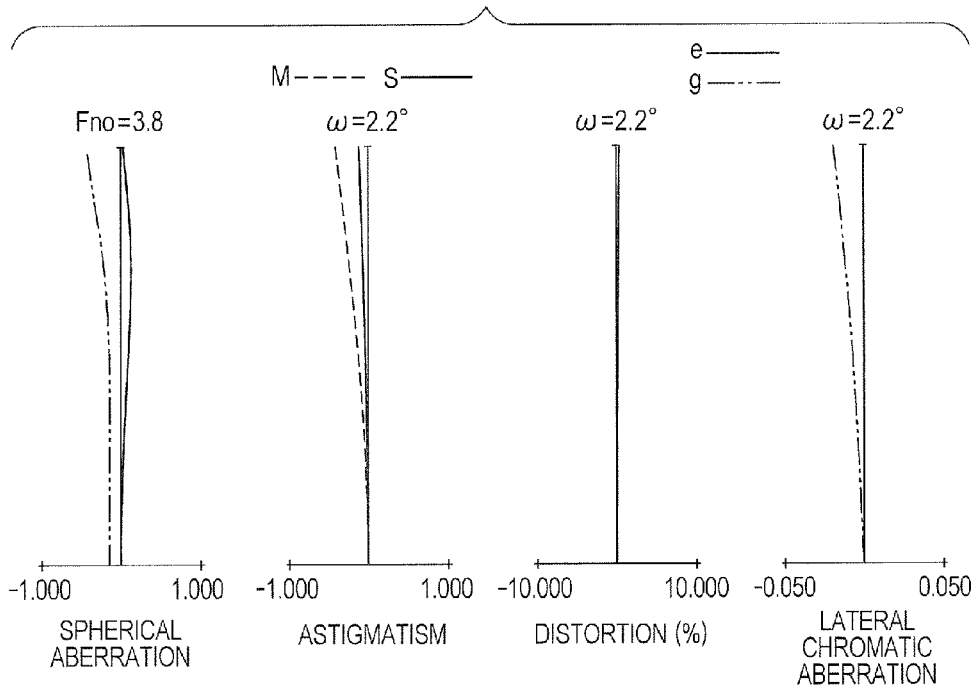
FIG. 8B is a longitudinal aberration diagram of Embodiment 3 (extender magnification of 2.0×) set to focus to infinity at a focal length of 143.0 mm with the extender inserted.
Figure 8C:
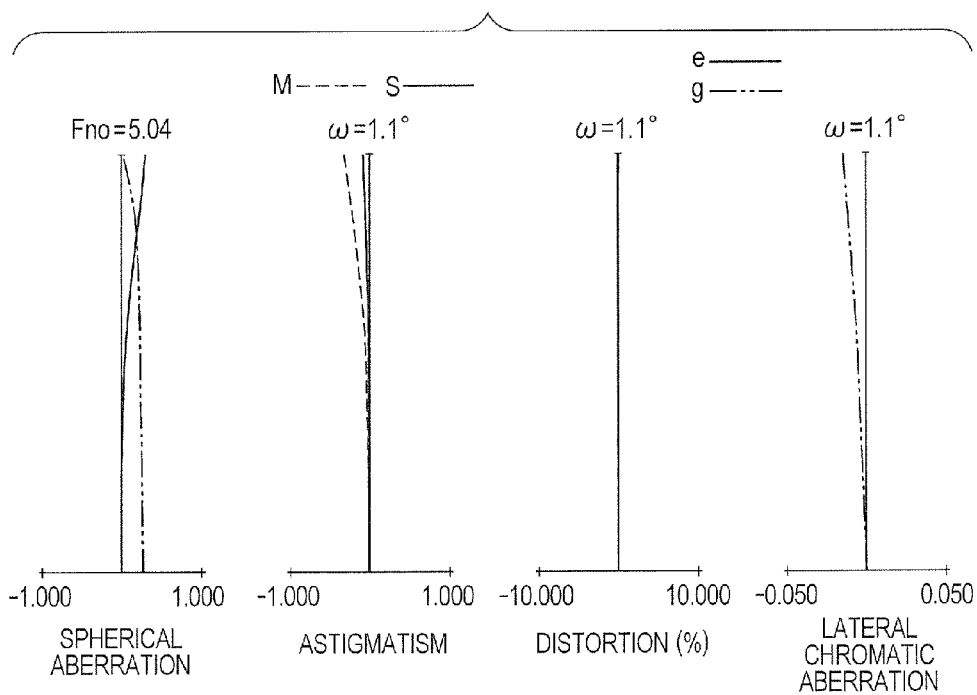
FIG. 8C is a longitudinal aberration diagram of Embodiment 3 (extender magnification of 2.0×) set to focus to infinity at a telephoto end with the extender inserted.

FIGS. 8A, 8B and 8C present longitudinal aberration diagrams of the zoom lens of Embodiment 3 set to focus to infinity at the wide angle end, at a focal length of 143.0 mm, and at the telephoto end, respectively, with the extender inserted. Embodiment 3 is a zoom lens with an extender magnification of 2.0×.

The following (Numerical Embodiment 3) presents numerical data of a numerical embodiment 3 for Embodiment 3.

Table 1 presents the values for the conditional expressions (1) to (11) obtained from the numerical embodiment 3.

The numerical embodiment 3 satisfies all the conditional expressions (1) to (11), and thus the extender is a high zoom ratio extender which is small and lightweight, and achieves high optical performance from the center to the periphery of the field of view.

Embodiment 4

Figure 9:
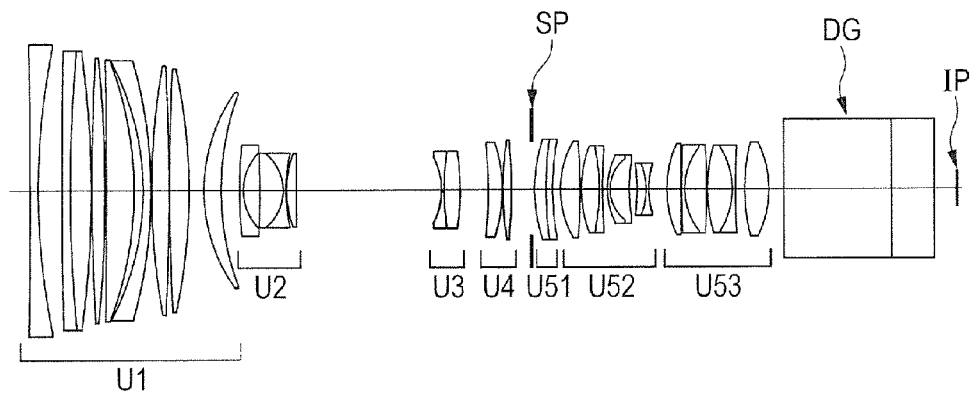
FIG. 9 is a cross sectional lens view of the zoom lens of Embodiment 4 (extender magnification of 2.0×) in the present invention set to focus an object at infinity at a wide angle end with the extender inserted.

FIG. 9 is a cross sectional lens view of a zoom lens of Embodiment 4 set to focus an object at infinity at the wide angle end with an extender inserted.

An extender lens unit U52 in Embodiment 4 has a structure similar to those in Embodiments 1, 2, and 3. Specifically, the extender lens unit U52 can be divided into a front lens sub-unit, a middle lens sub-unit, and a rear lens sub-unit each including a cemented lens. The front lens sub-unit includes a positive lens and a cemented lens of a positive lens and a negative lens, the middle lens sub-unit includes a cemented lens of a negative lens and a positive lens, and the rear lens sub-unit includes a cemented lens of a negative lens and a positive lens.

Figure 10A:
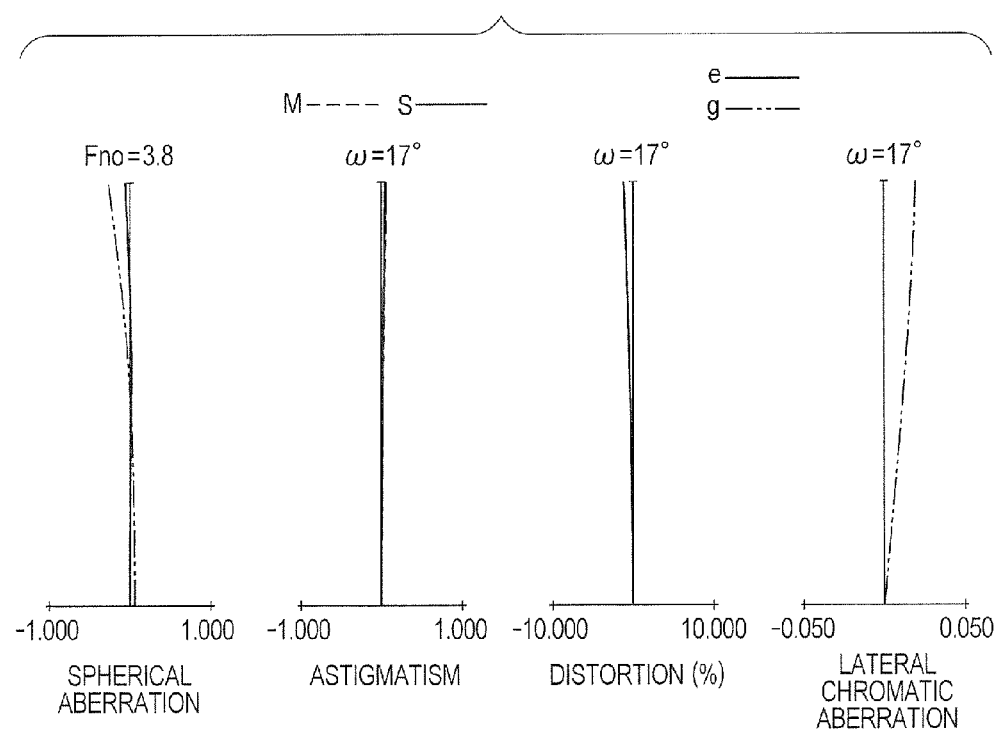
FIG. 10A is a longitudinal aberration diagram of Embodiment 4 (extender magnification of 2.0×) set to focus to infinity at the wide angle end with the extender inserted.
Figure 10B:
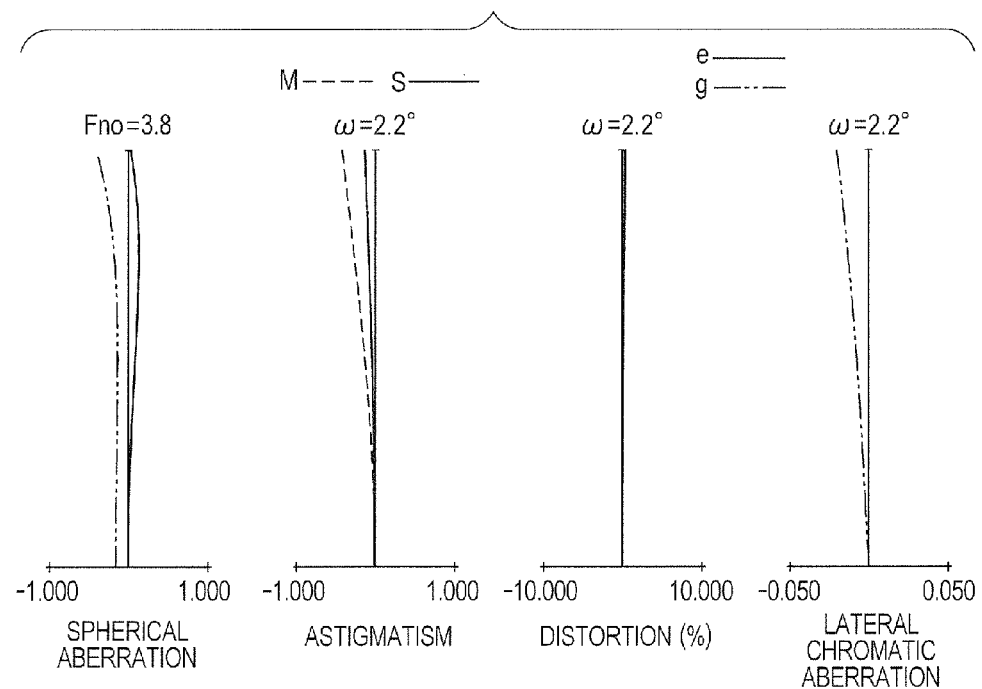
FIG. 10B is a longitudinal aberration diagram of Embodiment 4 (extender magnification of 2.0×) set to focus to infinity at a focal length of 143.0 mm with the extender inserted.
Figure 10C:
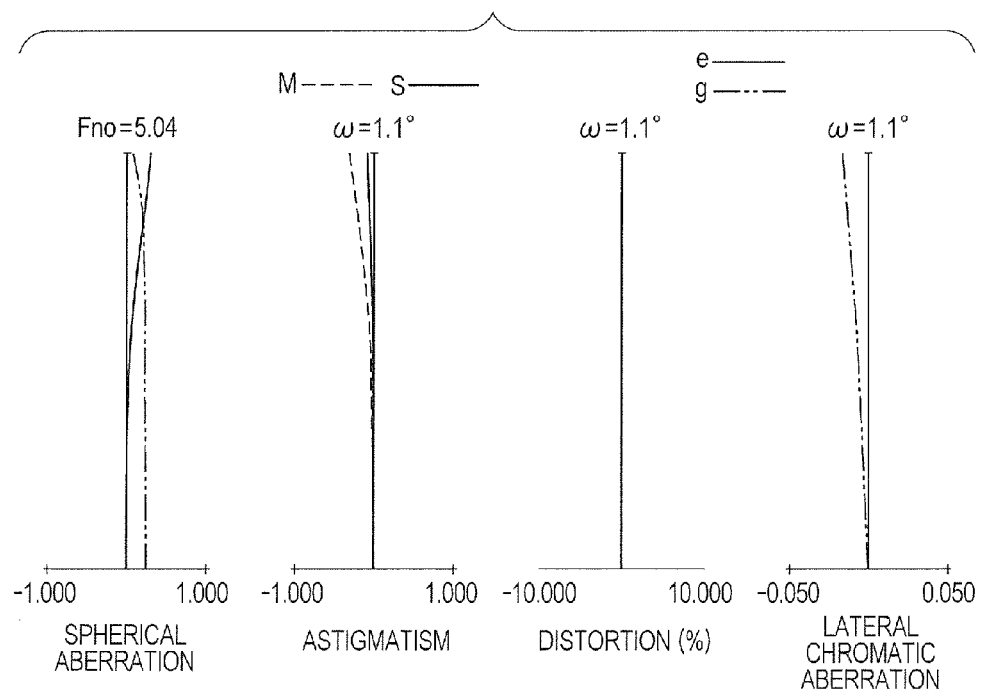
FIG. 10C is a longitudinal aberration diagram of Embodiment 4 (extender magnification of 2.0×) set to focus to infinity at a telephoto end with the extender inserted.

FIGS. 10A, 10B and 10C present longitudinal aberration diagrams of the zoom lens of Embodiment 3 set to focus to infinity at the wide angle end, at a focal length of 143.0 mm, and at the telephoto end, respectively, with the extender inserted. Embodiment 4 is a zoom lens with an extender magnification of 2.0×.

The following (Numerical Embodiment 4) presents numerical data of a numerical value embodiment 4 for Embodiment 4.

Table 1 presents the values for the conditional expressions (1) to (11) obtained from the numerical embodiment 4.

The numerical embodiment 4 satisfies all the conditional expressions (1) to (11), and thus the extender is a high zoom ratio extender which is small and lightweight, and achieves high optical performance from the center to the periphery of the field of view.

(Image Pickup Apparatus)

Figure 11:
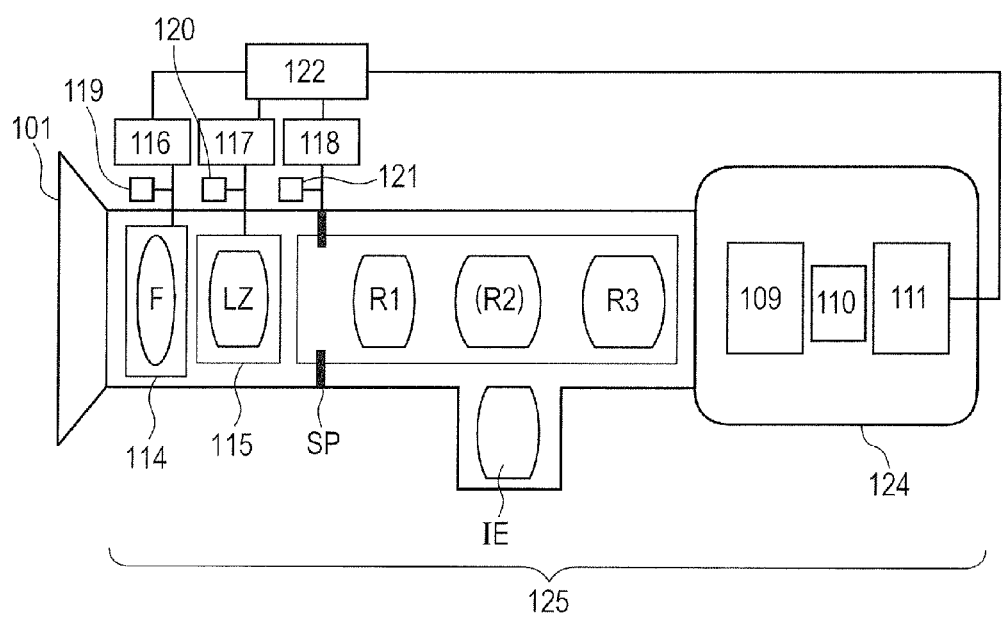
FIG. 11 is a schematic diagram of essential parts of an image pickup apparatus of the present invention.

FIG. 11 is a schematic diagram of essential parts of an image pickup apparatus (television camera system) using any one of the zoom lenses of Embodiments 1 to 4 of the present invention as an image-shooting optical system. In FIG. 11, reference sign 101 is any one of the zoom lenses of Embodiments 1 to 4, and 124 is a camera. The zoom lens 101 is detachably attachable to the camera 124. Reference sign 125 is an image pickup apparatus formed by attaching the zoom lens 101 to the camera 124. The zoom lens 101 includes a first lens unit F, a zooming unit LZ, and an R lens unit R for image formation. The first lens unit F includes lenses to be moved in focusing.

The zooming unit LZ includes at least two lens units to be moved in zooming. On an image side of the zooming unit LZ, the zoom lens 101 includes an aperture stop SP, a R1-lens unit R1, and an R2-lens unit R2 arranged, and also includes a lens unit IE which can be inserted into and retracted from an optical path. When the lens unit IE is inserted between the R1-lens unit and the R2-lens unit R2, the focal length range of the total system of the zoom lens 101 is changed. Reference signs 114, 115 denote drive mechanisms such as a helicoid and a cam for driving the first lens unit F and the zooming unit LZ, respectively, in the optical axis directions. Reference signs 116 to 118 denote motors (driving means) for electrically driving the drive mechanisms 114, 115 and the aperture stop SP, respectively.

Reference signs 119 to 121 are detectors, such as an encoder, a potentiometer, or a photo sensor, for detecting the positions of the first lens unit F and the zooming unit LZ on the optical axis, and detecting the aperture diameter of the aperture stop SP. In the camera 124, reference symbol 109 is a glass block equivalent to an optical filer or a color separation optical system in the camera 124, and reference symbol 110 is a solid-state image pickup element (photo-electric conversion element), such as a CCD sensor or CMOS sensor, for receiving light of a subject image formed by the zoom lens 101. Then, reference symbols 111 and 122 are CPUs for controlling various kinds of driving of the camera 124 and the zoom lens 101, respectively.

By applying the zoom lens of the present invention to the television camera as described above, the image pickup apparatus achieving high optical performance is obtained.

Hereinabove, the preferable embodiments of the present invention have been described. It should be noted, however, that the present invention is not limited to these embodiments, but may be modified or altered in various ways or modes without departing from the spirit of the present invention.

Numerical Embodiment 1

With Extender Retracted

[unit: mm]

Surface Data

| Surface Number | r | d | nd | vd | Effective Diameter |
|---|---|---|---|---|---|
| 1 | −2739.465 | 2.50 | 1.80518 | 25.4 | 83.85 |
| 2 | 205.990 | 7.30 | | | 81.14 |
| 3 | 2126.270 | 2.50 | 1.80100 | 35.0 | 80.02 |
| 4 | 431.787 | 6.46 | 1.43387 | 95.1 | 79.29 |
| 5 | −294.193 | 0.20 | | | 78.94 |
| 6 | 737.506 | 4.00 | 1.43387 | 95.1 | 77.48 |
| 7 | −389.597 | 8.97 | | | 77.22 |
| 8 | −1996.148 | 8.40 | 1.43387 | 95.1 | 76.50 |
| 9 | −105.236 | 2.78 | | | 76.01 |
| 10 | −80.400 | 2.40 | 1.74950 | 35.3 | 75.62 |
| 11 | −137.981 | 0.15 | | | 75.92 |
| 12 | 205.743 | 5.37 | 1.59522 | 67.7 | 72.73 |
| 13 | −688.450 | 0.20 | | | 72.30 |
| 14 | 766.607 | 5.89 | 1.59522 | 67.7 | 70.98 |
| 15 | −166.158 | 0.47 | | | 70.40 |
| 16 | 49.474 | 5.25 | 1.76385 | 48.5 | 56.80 |
| 17 | 80.442 | (Variable) | | | 55.75 |
| 18* | 250.565 | 1.07 | 2.00330 | 28.3 | 25.77 |
| 19 | 15.754 | 5.08 | | | 21.22 |
| 20 | −335.948 | 7.12 | 1.80809 | 22.8 | 20.97 |
| 21 | −13.909 | 0.81 | 1.88300 | 40.8 | 20.59 |
| 22 | 47.463 | 0.23 | | | 20.30 |
| 23 | 31.141 | 2.98 | 1.76182 | 26.5 | 20.58 |
| 24 | 525.010 | (Variable) | | | 20.40 |
| 25 | −20.491 | 0.75 | 1.75700 | 47.8 | 18.25 |
| 26 | 72.119 | 4.93 | 1.84649 | 23.9 | 20.13 |
| 27 | −76.694 | (Variable) | | | 21.77 |
| 28 | −137.792 | 4.30 | 1.64000 | 60.1 | 25.68 |
| 29 | −43.894 | 0.15 | | | 26.96 |
| 30 | 87.534 | 2.63 | 1.51633 | 64.1 | 28.13 |
| 31 | −152.496 | (Variable) | | | 28.22 |
| 32(Aperture Stop) | ∞ | 0.74 | | | 28.39 |
| 33 | 47.331 | 3.50 | 1.58913 | 61.1 | 28.59 |
| 34 | 107.311 | 2.00 | 1.95375 | 32.3 | 28.17 |
| 35 | 77.304 | 35.00 | | | 27.70 |
| 36 | 32.163 | 4.30 | 1.48749 | 70.2 | 25.80 |
| 37 | −9350.341 | 0.20 | | | 25.30 |
| 38 | 262.815 | 1.00 | 1.88300 | 40.8 | 25.05 |
| 39 | 19.684 | 6.73 | 1.49700 | 81.5 | 23.68 |
| 40 | −213.642 | 0.17 | | | 23.69 |
| 41 | 43.243 | 7.71 | 1.54814 | 45.8 | 24.15 |
| 42 | −22.795 | 1.00 | 1.88300 | 40.8 | 23.98 |
| 43 | 280.974 | 2.75 | | | 24.74 |
| 44 | 54.436 | 7.50 | 1.48749 | 70.2 | 26.35 |
| 45 | −30.603 | 4.50 | | | 26.60 |
| 46 | ∞ | 33.00 | 1.60859 | 46.4 | 40.00 |
| 47 | ∞ | 13.20 | 1.51633 | 64.1 | 40.00 |
| 48 | ∞ | (Variable) | | | 40.00 |
| Image Plane | ∞ | | | | |

Aspheric Surface Data
18th Surface k = 1.72144e+002
A4 = 9.19589e−006
A6 = −1.71369e−008
A8 = 5.48441e−011
A10 = −3.19872e−013
A12 = 7.81761e−016

Various Data
Zoom Ratio 15.50

| | Wide Angle | Middle | Telephoto |
|---|---|---|---|
| Focal Length | 9.00 | 71.50 | 143.23 |
| F Number | 1.90 | 1.90 | 2.52 |
| Half Angle of View | 31.43 | 4.40 | 2.20 |
| Image Height | 5.50 | 5.50 | 5.50 |
| Lens Total Length | 284.20 | 284.20 | 284.20 |
| BF | 7.20 | 7.20 | 7.20 |
| d17 | 1.32 | 44.89 | 50.08 |
| d24 | 44.48 | 5.58 | 4.40 |
| d27 | 8.62 | 9.93 | 1.72 |
| d31 | 6.38 | 0.40 | 4.60 |
| d48 | 7.20 | 7.20 | 7.20 |
| Entrance Pupil Position | 61.67 | 350.26 | 585.23 |
| Exit Pupil Position | 502.54 | 502.54 | 502.54 |
| Front Side Principal Point Position | 70.83 | 432.08 | 769.88 |
| Rear Side Principal Point Position | −1.80 | −64.30 | −136.03 |

Zoom Lens Unit Data

| Unit | Start Surface | Focal Length | Lens Structure Length | Front Side Principal Point Position | Rear Side Principal Point Position |
|---|---|---|---|---|---|
| 1 | 1 | 68.87 | 62.84 | 41.97 | −0.50 |
| 2 | 18 | −15.71 | 17.29 | 0.80 | −11.06 |
| 3 | 25 | −42.70 | 5.68 | −1.48 | −4.74 |
| 4 | 28 | 51.54 | 7.09 | 3.58 | −0.89 |
| 5 | 32 | 53.11 | 123.30 | 58.80 | −54.77 |

Individual Lens Data

| Lens | Start Surface | Focal Length |
|---|---|---|
| 1 | 1 | −237.85 |
| 2 | 3 | −676.87 |
| 3 | 4 | 404.38 |
| 4 | 6 | 588.20 |
| 5 | 8 | 255.71 |
| 6 | 10 | −261.73 |
| 7 | 12 | 266.72 |
| 8 | 14 | 229.97 |
| 9 | 16 | 156.75 |
| 10 | 18 | −16.79 |
| 11 | 20 | 17.78 |
| 12 | 21 | −12.11 |
| 13 | 23 | 43.34 |
| 14 | 25 | −21.01 |
| 15 | 26 | 44.59 |
| 16 | 28 | 98.88 |
| 17 | 30 | 108.11 |
| 18 | 33 | 140.70 |
| 19 | 34 | −299.61 |
| 20 | 36 | 65.76 |
| 21 | 38 | −24.14 |
| 22 | 39 | 36.61 |
| 23 | 41 | 28.41 |
| 24 | 42 | −23.84 |
| 25 | 44 | 41.38 |
| 26 | 46 | 0.00 |
| 27 | 47 | 0.00 |

<With Extender Inserted>

[unit: mm]

Surface Data

| Surface Number | r | d | nd | vd | Effective Diameter |
|---|---|---|---|---|---|
| 35 | 77.304 | 2.41 | | | 27.70 |
| IE 36 | 28.678 | 6.10 | 1.49700 | 81.5 | 27.45 |
| IE 37 | −128.796 | 0.40 | | | 26.72 |

-continued

[unit: mm]

| | | | | | |
|---|---|---|---|---|---|
| IE 38 | 32.211 | 5.47 | 1.48749 | 70.2 | 24.23 |
| IE 39 | −65.686 | 1.00 | 1.84666 | 23.8 | 22.64 |
| IE 40 | 95.220 | 1.49 | | | 21.35 |
| IE 41 | 25.840 | 0.80 | 1.88300 | 40.8 | 19.26 |
| IE 42 | 12.820 | 5.82 | 1.58144 | 40.8 | 17.43 |
| IE 43 | 100.552 | 2.20 | | | 15.78 |
| IE 44 | −48.570 | 2.97 | 1.92286 | 18.9 | 14.56 |
| IE 45 | −21.912 | 0.80 | 1.88300 | 40.8 | 13.91 |
| IE 46 | 21.972 | 5.54 | | | 13.05 |

Various Data

| | Wide Angle | Middle | Telephoto |
|---|---|---|---|
| Focal Length | 18.00 | 143.00 | 286.46 |
| F Number | 3.80 | 3.80 | 5.04 |
| Half Angle of View | 16.99 | 2.20 | 1.10 |
| Image Height | 5.50 | 5.50 | 5.50 |
| Lens Total Length | 284.22 | 284.22 | 284.22 |
| BF | 7.22 | 7.22 | 7.22 |

Zoom Lens Unit Data

| Unit | Start Surface | Focal Length | Lens Structure Length | Front Side Principal Point Position | Rear Side Principal Point Position |
|---|---|---|---|---|---|
| 51 | 32 | 252.74 | 6.24 | −7.43 | −11.03 |
| 52a | 36 | 42.41 | 12.97 | −1.48 | −9.50 |
| 52b | 41 | 179.86 | 6.62 | −6.13 | −9.92 |
| 52c | 44 | −16.96 | 3.77 | 1.29 | −0.62 |
| 53 | 47 | 50.59 | 82.06 | 16.98 | −41.44 |

Individual Lens Data

| Lens | Start Surface | Focal Length |
|---|---|---|
| 20 | IE36 | 47.67 |
| 21 | IE38 | 45.01 |
| 22 | IE39 | −45.33 |
| 23 | IE41 | −29.50 |
| 24 | IE42 | 24.52 |
| 25 | IE44 | 40.55 |
| 26 | IE45 | −12.25 |

Numerical Embodiment 2

With Extender Inserted

[unit: mm]

Surface Data

| Surface Number | r | d | nd | vd | Effective Diameter |
|---|---|---|---|---|---|
| 35 | 77.304 | 2.41 | | | 27.70 |
| IE36 | 28.255 | 5.97 | 1.49700 | 81.5 | 27.45 |
| IE37 | −217.283 | 0.40 | | | 26.67 |
| IE38 | 40.378 | 5.34 | 1.48749 | 70.2 | 24.80 |
| IE39 | −55.008 | 1.00 | 1.84666 | 23.8 | 23.38 |
| IE40 | 406.677 | 2.08 | | | 22.37 |
| IE41 | 18.991 | 0.80 | 1.88300 | 40.8 | 18.94 |
| IE42 | 10.982 | 5.74 | 1.50137 | 56.4 | 16.86 |
| IE43 | 35.843 | 2.60 | | | 15.15 |
| IE44 | −51.506 | 2.32 | 1.92286 | 18.9 | 14.14 |
| IE45 | −19.713 | 0.80 | 1.88300 | 40.8 | 13.77 |
| IE46 | 24.974 | 5.54 | | | 13.02 |

-continued

[unit: mm]

Various Data

| | Wide Angle | Middle | Telephoto |
|---|---|---|---|
| Focal Length | 18.00 | 143.00 | 286.46 |
| F Number | 3.80 | 3.80 | 5.04 |
| Half Angle of View | 16.99 | 2.20 | 1.10 |
| Image Height | 5.50 | 5.50 | 5.50 |
| Lens Total Length | 284.03 | 284.03 | 284.03 |
| BF | 7.03 | 7.03 | 7.03 |

Zoom Lens Unit Data

| Unit | Start Surface | Focal Length | Lens Structure Length | Front Side Principal Point Position | Rear Side Principal Point Position |
|---|---|---|---|---|---|
| 51 | 32 | 253.10 | 6.24 | −7.42 | −11.02 |
| 52a | 36 | 41.86 | 12.71 | −0.24 | −8.48 |
| 52b | 41 | −1618.14 | 6.54 | 121.25 | 108.79 |
| 52c | 44 | −19.15 | 3.12 | 1.06 | −0.54 |
| 53 | 47 | 50.50 | 82.06 | 16.94 | −41.56 |

Individual Lens Data

| Lens | Start Surface | Focal Length |
|---|---|---|
| 20 | IE36 | 50.72 |
| 21 | IE38 | 48.66 |
| 22 | IE39 | −57.17 |
| 23 | IE41 | −30.94 |
| 24 | IE42 | 29.32 |
| 25 | IE44 | 33.43 |
| 26 | IE45 | −12.37 |

Numerical Embodiment 3

With Extender Inserted

[unit: mm]

Surface Data

| Surface Number | r | d | nd | vd | Effective Diameter |
|---|---|---|---|---|---|
| 35 | 77.304 | 2.41 | | | 27.70 |
| IE36 | 26.195 | 5.82 | 1.49700 | 81.5 | 27.44 |
| IE37 | 3405.072 | 0.40 | | | 26.60 |
| IE38 | 83.606 | 4.80 | 1.48749 | 70.2 | 25.70 |
| IE39 | −45.731 | 1.00 | 1.84666 | 23.8 | 24.56 |
| IE40 | −136.134 | 1.49 | | | 23.91 |
| IE41 | 20.273 | 0.80 | 1.88300 | 40.8 | 20.31 |
| IE42 | 11.091 | 6.35 | 1.58913 | 61.1 | 17.87 |
| IE43 | 41.737 | 3.29 | | | 16.05 |
| IE44 | −45.529 | 2.30 | 1.92286 | 18.9 | 14.32 |
| IE45 | −19.382 | 0.80 | 1.88300 | 40.8 | 13.91 |
| IE46 | 22.802 | 5.54 | | | 13.05 |

Various Data

| | Wide Angle | Middle | Telephoto |
|---|---|---|---|
| Focal Length | 18.00 | 143.00 | 286.46 |
| F Number | 3.80 | 3.80 | 5.04 |
| Half Angle of View | 16.99 | 2.20 | 1.10 |
| Image Height | 5.50 | 5.50 | 5.50 |
| Lens Total | 284.20 | 284.20 | 284.20 |

-continued

[unit: mm]

| | Length | | | |
|---|---|---|---|---|
| | BF | 7.20 | 7.20 | 7.20 |

Zoom Lens Unit Data

| Unit | Start Surface | Focal Length | Lens Structure Length | Front Side Principal Point Position | Rear Side Principal Point Position |
|---|---|---|---|---|---|
| 51 | 32 | 253.10 | 6.24 | −7.42 | −11.02 |
| 52a | 36 | 43.93 | 12.02 | 0.69 | −7.42 |
| 52b | 41 | 213.38 | 7.15 | −15.86 | −18.92 |
| 52c | 44 | −17.20 | 3.10 | 1.04 | −0.55 |
| 53 | 47 | 50.50 | 82.06 | 16.94 | −41.56 |

Individual Lens Data

| Lens | Start Surface | Focal Length |
|---|---|---|
| 20 | IE36 | 53.09 |
| 21 | IE38 | 61.39 |
| 22 | IE39 | −81.75 |
| 23 | IE41 | −28.92 |
| 24 | IE42 | 23.81 |
| 25 | IE44 | 35.09 |
| 26 | IE45 | −11.76 |

Numerical Embodiment 4

With Extender Inserted

[unit: mm]

Surface Data

| Surface Number | r | d | nd | vd | Effective Diameter |
|---|---|---|---|---|---|
| 35 | 77.304 | 2.41 | | | 27.70 |
| IE36 | 28.195 | 6.03 | 1.49700 | 81.5 | 27.45 |
| IE37 | −181.568 | 0.40 | | | 26.68 |
| IE38 | 35.352 | 5.47 | 1.48749 | 70.2 | 24.54 |
| IE39 | −58.879 | 1.00 | 1.84666 | 23.8 | 23.03 |
| IE40 | 199.912 | 1.50 | | | 21.91 |
| IE41 | 21.995 | 0.80 | 1.83481 | 42.7 | 19.21 |
| IE42 | 11.351 | 5.88 | 1.51742 | 52.4 | 17.07 |
| IE43 | 47.232 | 2.45 | | | 15.37 |
| IE44 | −50.685 | 2.73 | 1.92286 | 18.9 | 14.31 |
| IE45 | −20.260 | 0.80 | 1.88300 | 40.8 | 13.81 |
| IE46 | 23.950 | 5.54 | | | 13.02 |

Various Data

| | Wide Angle | Middle | Telephoto |
|---|---|---|---|
| Focal Length | 18.00 | 143.00 | 286.46 |
| F Number | 3.80 | 3.80 | 5.04 |
| Half Angle of View | 16.99 | 2.20 | 1.10 |
| Image Height | 5.50 | 5.50 | 5.50 |
| Lens Total Length | 284.04 | 284.04 | 284.04 |
| BF | 7.04 | 7.04 | 7.04 |

Zoom Lens Unit Data

| Unit | Start Surface | Focal Length | Lens Structure Length | Front Side Principal Point Position | Rear Side Principal Point Position |
|---|---|---|---|---|---|
| 51 | 32 | 253.10 | 6.24 | −7.42 | −11.02 |
| 52a | 36 | 40.55 | 12.90 | −0.45 | −8.72 |
| 52b | 41 | 7938.18 | 6.68 | −475.66 | −452.88 |
| 52c | 44 | −18.43 | 3.53 | 1.20 | −0.60 |
| 53 | 47 | 50.50 | 82.06 | 16.94 | −41.56 |

Individual Lens Data

| Lens | Start Surface | Focal Length |
|---|---|---|
| 20 | IE36 | 49.58 |
| 21 | IE38 | 46.19 |
| 22 | IE39 | −53.63 |
| 23 | IE41 | −29.09 |
| 24 | IE42 | 27.35 |
| 25 | IE44 | 35.06 |
| 26 | IE45 | −12.33 |

TABLE 1

Values in Conditional Expressions Obtained from Embodiments

| Conditional Expression | | Embodiment 1 | 2 | 3 | 4 |
|---|---|---|---|---|---|
| | Nn | 1.88300 | 1.88300 | 1.88300 | 1.83481 |
| | Np | 1.58144 | 1.50137 | 1.58913 | 1.51742 |
| | vn | 40.76 | 40.76 | 40.76 | 42.73 |
| | vp | 40.75 | 56.42 | 61.14 | 52.43 |
| | fbn | −29.67 | −30.94 | −28.92 | −29.09 |
| | fbp | 24.67 | 29.32 | 23.81 | 27.35 |
| | L_b | 15.26 | 15.59 | 14.31 | 15.20 |
| | L_IE | 27.05 | 27.05 | 27.05 | 27.05 |
| | fa | 42.34 | 41.86 | 43.93 | 40.55 |
| | fb | 180.97 | −1618.14 | 213.38 | 7938.18 |
| | fc | −17.01 | −19.15 | −17.20 | −18.43 |
| | h_in | 13.7275 | 13.726 | 13.7175 | 13.7255 |
| | h_out | 6.523 | 6.51 | 6.5225 | 6.51 |
| | h_b | 8.713 | 8.43 | 8.935 | 8.533 |
| | R_b | 12.81958 | 10.98158 | 11.09177 | 11.35141 |
| (1) | Nn − Np | 0.302 | 0.382 | 0.294 | 0.317 |
| (2) | |fbp/fb| | 0.1639 | 0.0191 | 0.1355 | 0.0037 |
| (3) | |fbn/fb| | 0.1363 | 0.0181 | 0.1116 | 0.0034 |
| (4) | L_b/L_IE | 0.564 | 0.576 | 0.529 | 0.562 |
| (5) | |vn − vp| | 0.010 | 15.660 | 20.380 | 9.700 |
| (6) | |fa/fb| | 0.234 | 0.026 | 0.206 | 0.005 |
| (7) | |fc/fb| | 0.094 | 0.012 | 0.081 | 0.002 |
| (8) | |fbn/fbp| | 1.203 | 1.055 | 1.214 | 1.064 |
| (9) | h_in/h_out | 2.104 | 2.108 | 2.103 | 2.108 |
| (10) | h_in/L_IE | 0.507 | 0.507 | 0.507 | 0.507 |
| (11) | R_b/h_b | 1.471 | 1.303 | 1.241 | 1.330 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194524, filed Sep. 30, 2015, which is hereby incorporated by reference herein in its entirety.

What is claimed is:

1. A zoom lens comprising in order from an object side to an image side:
   a zoom lens unit that moves during zooming;
   an aperture stop; and
   a relay lens unit that does not move for zooming,
   wherein the relay lens unit includes an extender lens unit changing a focal length range of the zoom lens by entering into and leaving from an optical path of the zoom lens, wherein the extender lens unit comprises a front lens sub-unit, a middle lens sub-unit, and a rear lens sub-unit, wherein each of the front lens sub-unit, the middle lens sub-unit, and the rear lens sub-unit includes a single positive lens and a single negative lens, and wherein the following expressions are satisfied:

$0.250 < Nn - Np;$ $|fbp/fb| < 0.200;$ and $|fbn/fb| < 0.200,$ where Np and fbp respectively denote a refractive index and a focal length of the positive lens included in the middle lens sub-unit, Nn and fbn respectively denote a refractive index and a focal length of the negative lens included in the middle lens sub-unit, and fb denotes a focal length of the middle lens sub-unit.

2. The zoom lens according to claim 1, wherein the following expression is satisfied:

$0.35 < L\_b/L\_IE < 0.65,$ where L_IE denotes a total length of the extender lens unit, and L_b denotes a length from an object-side vertex position of the lens disposed on a most object side among the lenses included in the extender lens unit to an image-side vertex position of the negative lens included in the middle lens sub-unit.

3. The zoom lens according to claim 1, wherein the lenses included in the middle lens sub-unit satisfy the following expression:

$|vn - vp| < 25.00,$ where vp denotes an Abbe number of the positive lens and vn denotes an Abbe number of the negative lens.

4. The zoom lens according to claim 1, wherein the extender lens unit satisfies the following expressions:

$|fa/fb| < 0.250,$ $|fc/fb| < 0.150,$ where fa, fb and fc respectively denote focal lengths of the front lens sub-unit, the middle lens sub-unit, and the rear lens sub-unit.

5. The zoom lens according to claim 1, wherein the lenses of the middle lens sub-unit satisfy the following expression:

$0.80 < |fbn/fbp| < 1.30,$ where fbp denotes a focal length of the positive lens and fbn denotes a focal length of the negative lens.

6. The zoom lens according to claim 1, wherein the middle lens sub-unit includes a cemented lens of a lens having a positive refractive power and a lens having a negative refractive power.

7. The zoom lens according to claim 1, wherein the front lens sub-unit includes a lens having a positive refractive power, and a cemented lens of a lens having a positive refractive power and a lens having a negative refractive power, and the front lens sub-unit has a positive refractive power as a whole.

8. The zoom lens according to claim 1, wherein the rear lens sub-unit includes a cemented lens of a lens having a positive refractive power and a lens having a negative refractive power, and the rear lens sub-unit has a negative refractive power as a whole.

9. The zoom lens according to claim 1, wherein the following expression is satisfied when focused on an object at infinity at a wide angle end:

$1.60 < h\_in/h\_out < 2.60,$ where h_in denotes a maximum beam height of axial rays on a surface disposed on a most object side in the extender lens unit, and h_out denotes a maximum beam height of the axial rays on a surface disposed on a most image side in the extender lens unit.

10. The zoom lens according to claim 1, wherein the extender lens unit satisfies the following expression is satisfied when focused on an object at infinity at a wide angle end:

$0.48 < h\_in/L\_IE < 0.55,$ where L_IE denotes a total length of the extender lens unit, and h_in denotes a maximum beam height of axial rays on a surface disposed on most object side in the extender lens unit.

11. The zoom lens according to claim 1, wherein the negative lens and the positive lens included in the middle lens sub-unit are adjacent to each other, and wherein the following expression is satisfied:

$1.00 < R\_b/h\_b < 2.00,$ where R_b denotes a curvature radius of an image-side surface of the object-side lens included in the middle lens sub-unit, and h_b denotes an effective beam diameter of the image-side surface.

12. The zoom lens according to claim 1, wherein the zoom lens includes a first lens unit provided on an object side of the zoom lens unit, having a positive refractive power, and not being moved for zooming, and wherein the zoom lens unit includes a second lens unit being moved for zooming and having a negative refractive power, and a third lens unit being moved for zooming and having a negative refractive power.

13. The zoom lens according to claim 1, wherein the aperture stop does not move for zooming.

14. An extender lens unit constituting a part of a zoom lens, and configured to change a focal length range of the zoom lens by being inserted into and retracted from an optical path of a relay lens unit which is not moved for zooming, wherein the extender lens unit comprises a front lens sub-unit, a middle lens sub-unit, and a rear lens sub-unit, wherein each of the front lens sub-unit, the middle lens sub-unit, and the rear lens sub-unit includes a cemented lens of a single positive lens and a single negative lens, wherein the middle lens sub-unit satisfies the following expressions:

$0.250 < Nn - Np;$ $|fbp/fb| < 0.200;$ and $|fbn/fb| < 0.200,$ where Np and fbp respectively denote a refractive index and a focal length of the positive lens included in the middle lens sub-unit, Nn and fbn respectively denote a refractive index and a focal length of the negative lens included in the middle lens sub-unit, and fb denotes a focal length of the middle lens sub-unit.

15. An image pickup apparatus comprising:

a zoom lens; and a solid-state image pickup element that receives light of an image formed by the zoom lens, wherein the zoom lens comprising in order from an object side to an image side:

a zoom lens unit that moves during zooming;

an aperture stop; and a relay lens unit that does not move for zooming, wherein the relay lens unit includes an extender lens unit changing a focal length range of the zoom lens by entering into and leaving from an optical path of the zoom lens, wherein the extender lens unit comprises a front lens sub-unit, a middle lens sub-unit, and a rear lens sub-unit, wherein each of the front lens sub-unit, the middle lens sub-unit, and the rear lens sub-unit includes a single positive lens and a single negative lens, and wherein the following expressions are satisfied:

$$0.250 < Nn - Np;$$

$$|fbp/fb| < 0.200; \text{ and}$$

$$|fbn/fb| < 0.200,$$

where $Np$ and $fbp$ respectively denote a refractive index and a focal length of the positive lens included in the middle lens sub-unit, $Nn$ and $fbn$ respectively denote a refractive index and a focal length of the negative lens included in the middle lens sub-unit, and $fb$ denotes a focal length of the middle lens sub-unit.

* * * * *